May 29, 1951      H. P. SERIO      2,554,644
HANDLE ATTACHMENT FOR COOKING UTENSILS
Filed Jan. 22, 1947      2 Sheets-Sheet 1
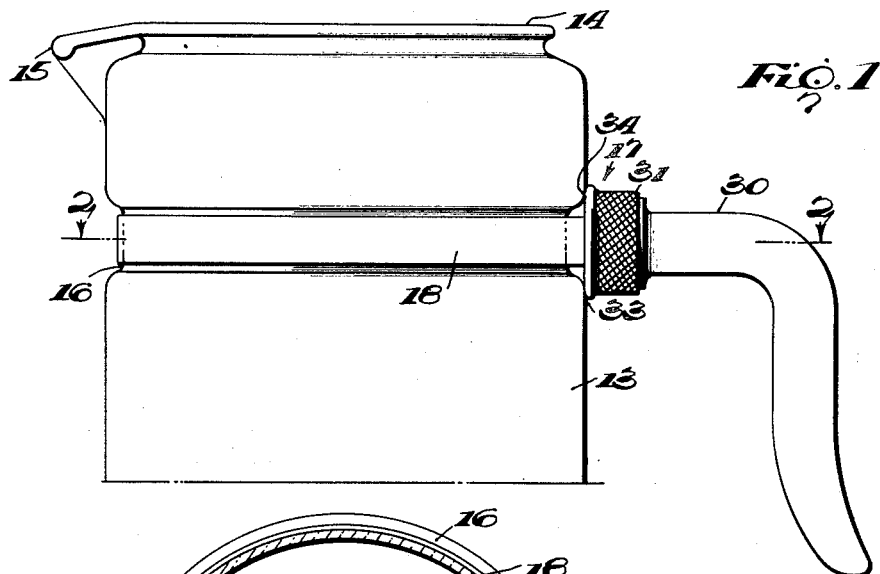
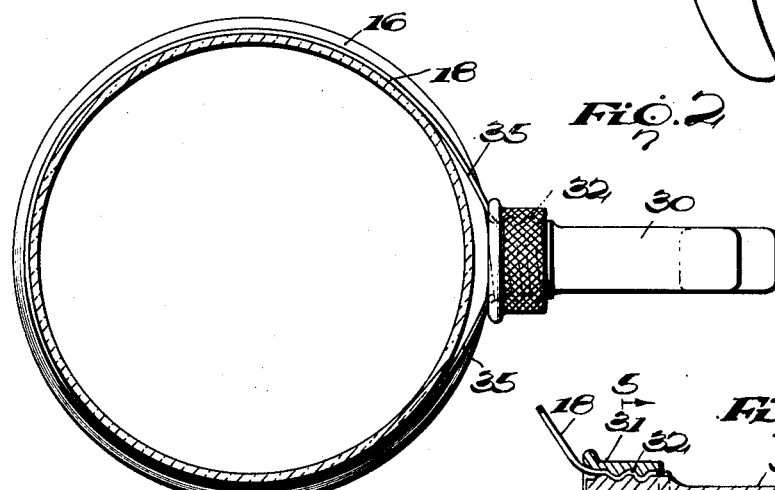
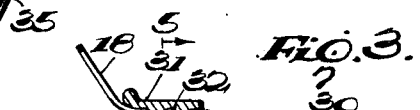
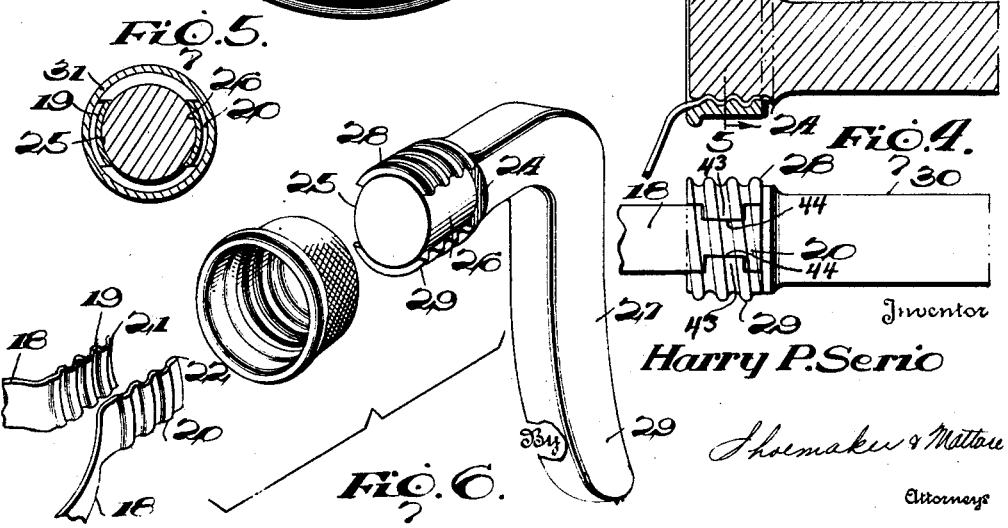
Inventor
Harry P. Serio
By Shoemaker & Mattou
Attorneys May 29, 1951          H. P. SERIO          2,554,644
HANDLE ATTACHMENT FOR COOKING UTENSILS
Filed Jan. 22, 1947          2 Sheets-Sheet 2
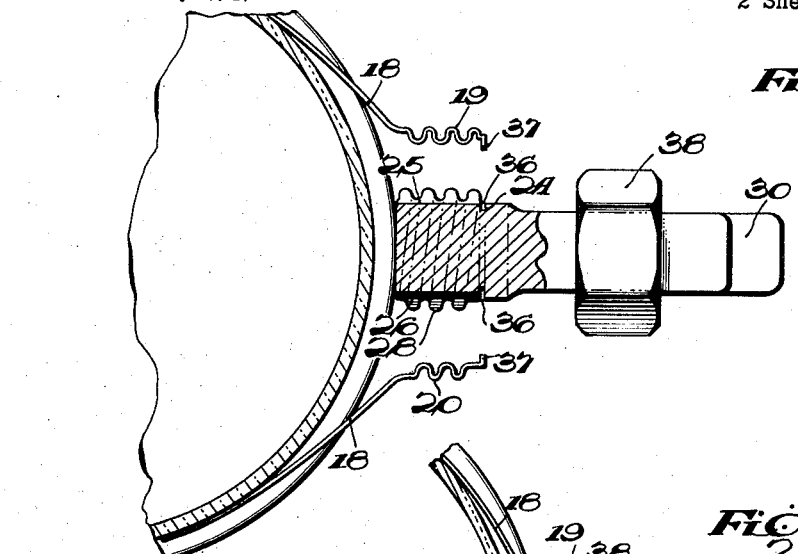
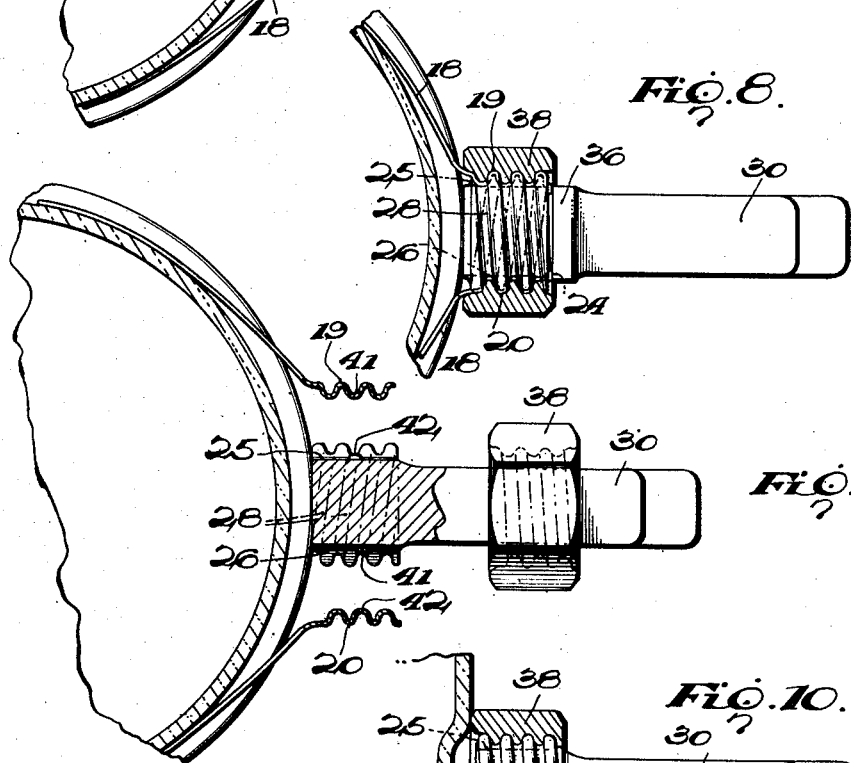
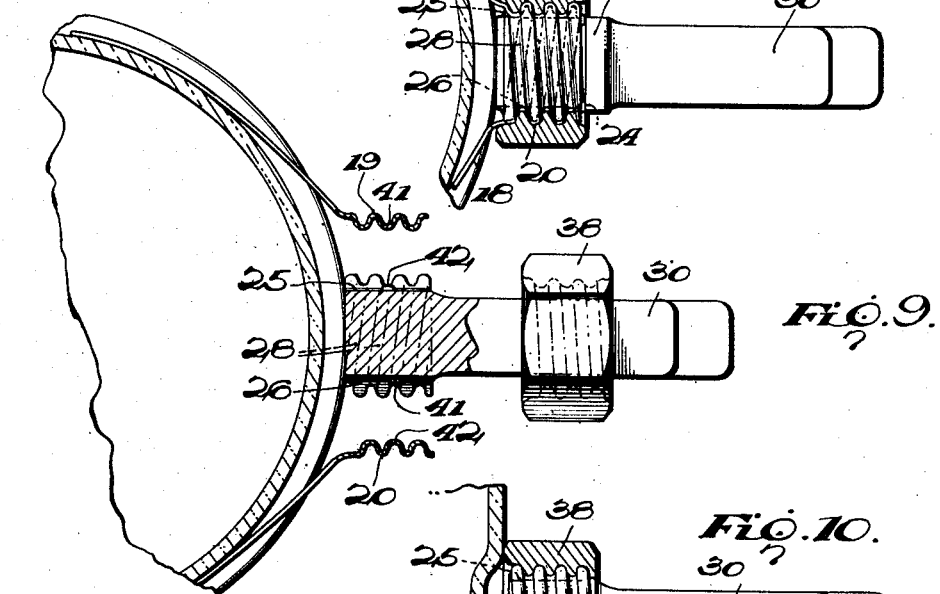
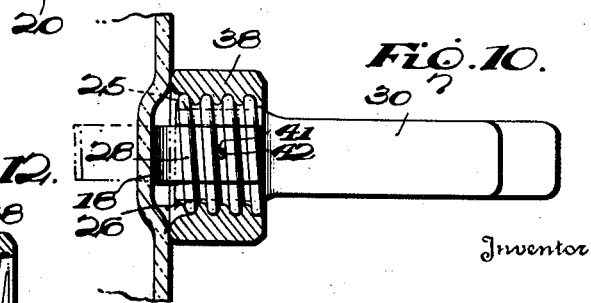
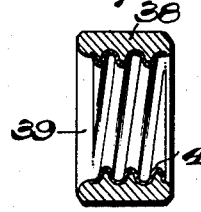
Inventor
Harry P. Serio
By Shoemaker & Mattare
Attorneys Patented May 29, 1951

2,554,644

UNITED STATES PATENT OFFICE 2,554,644

HANDLE ATTACHMENT FOR COOKING UTENSILS

Harry P. Serio, Elmira, N. Y., assignor of one-half to Anthony W. Serio, Elmira, N. Y.

Application January 22, 1947, Serial No. 723,578

9 Claims. (Cl. 294—27)

This invention relates to handle attachments for cooking utensils. The invention is directed more particularly to that type of handle attachment for glass or other cooking utensils wherein the attachment consists of a band which substantially encircles the portion of the outer circumference of the utensil and which band is provided with radially extended free ends or projections and which projections are exteriorly screw-threaded for cooperation with partially formed screw threads on the end of the handle and a nut or other securing means engageable with the screw threads on the handle and the ends of the band whereby the band and handle are immovably secured to the utensil and wherein the utensil is preferably provided with a circumferential groove in which the band is disposed.

In the above mentioned type of handle attachment for cooking utensils, it has been found that considerable time and ingenuity are involved in the assembly of the band and handle with the utensil in that the screw-threaded ends of the band must be manually held in cooperative relationship with the partial screw threads on the end of the handle and the nut engaged over the screw threads on the handle and the ends of the band. In my invention, I provide definite means for aligning the screw threads on the free ends of the band with the partial screw threads on the end of the handle which, of course, permits ready association of the nut with the screw threads on the end of the handle and the aligned screw threads on the ends of the band.

It has also been found in the type of handle attachments referred to above that the nut which engages the screw threads on the ends of the band and the screw threads on the end of the handle, when in fully engaged condition and contacting portions of the glass vessel and if such nut be made of a relatively hard metal or other material, results in scratching the glass utensil and acting more or less as a glass cutter and thereby weakening that engaged portion of the vessel which might break. To overcome this objection, I provide a nut fabricated of plastic material such as Bakelite or any of the other synthetic materials having inherent rigid qualities, yet being so that the surface contact of the nut with the vessel will not result in any scratching or marring of the glass utensil and thus prevent any possibility of breaking at the points where the plastic nut engages the utensil.

With the foregoing in mind, it is the object of my invention to provide means acting to definitely align the screw threads on the free ends of the utensil encircling band with the partial screw threads formed on the end of the handle.

Another object of my invention is to provide definite means acting as a stop and aligning of the free threaded ends of the band when the latter are associated with the partial screw-threaded end of the handle.

Another object of my invention is to provide definite means acting as a stop and aligning of the screw threads on the ends of the band with the partial screw threads on the end of the handle and such stop being in the form of either a shoulder portion on the end of the handle or inwardly directed extensions of the free end of the band which engage in recesses or the like in the end of the handle or the provision of interengaging means by the free ends of the band and the end of the handle and such interengaging means consisting of oppositely disposed projections on the end of the handle for engaging an opening or recess in each free end of the band.

Another object of my invention is to provide a securing nut or the like fabricated of such material that will not scratch or cut the glass utensil when the said nut is associated with the screw-threaded end of the handle and secures the free ends of the band in association with the handle and the nut being in contact with exterior portions of the glass utensil.

Another object of my invention is to provide a band and handle attachment preferably for glass cooking utensils wherein the band has outwardly extended screw-threaded free ends in alignment with partially formed screw threads on the end of the handle and a plastic nut engageable with the aligned screw threads on the ends of the band and the end of the handle and which nut possesses certain inherent rigid qualities yet being relatively soft as compared with glass and incapable of scratching or cutting the glass of the utensil when it engages to firmly and immovably secure the band and handle to the utensil.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims, may be resorted to without departing from the spirit or sacrificing any advantages of the invention.

In the drawings:

Fig. 1 is a side elevational view of the band and handle attachment for a cooking utensil such as a percolator the latter being only partially shown;

Fig. 2 is a cross sectional view substantially on the lines 2—2 of Fig. 1;

Fig. 3 is a horizontal sectional view showing the free end portions of the band associated with the handle and nut engaged about the screw threads partially formed on the end of the handle and on the ends of the band;

Fig. 4 is a side elevational view of a modification of my invention showing a different construction of the end portions of the band associated and in alignment with partial screw threads on the end of the handle;

Fig. 5 is a vertical sectional view on the lines 5—5 of Fig. 3;

Fig. 6 is an exploded perspective showing the exteriorly threaded free ends of the band as in Figs. 1, 2 and 3, the securing nut and the partially threaded end of the handle;

Fig. 7 is a horizontal plan view showing a still further modification of my invention and depicting another stop and aligning means for the threads on the free ends of the band with the partial threads on the end of the handle;

Fig. 8 is a transverse sectional view of the modification of Fig. 7 showing the ends of the band in proper association with the partially threaded end of the handle and with the plastic nut securing the ends of the band to the handle;

Fig. 9 is a horizontal plan view similar to Fig. 7 and presenting further modification of the invention;

Fig. 10 is a sectional view of the modification shown in Fig. 9 showing the parts in assembled relationship;

Fig. 11 is a vertical sectional view of the plastic nut; and

Fig. 12 is a vertical sectional view of a modification of the plastic nut embodying therewith a metallic liner.

The invention will be readily understood by referring to the drawings in detail where like reference numerals in the several figures denote the same parts.

A more or less conventional cooking utensil 13, in this instance shown as a percolator and fabricated of glass such as "pyrex" and being of substantially cylindrical shape and open at its top 14 and having a pouring spout 15 and a circumferential groove 16 is shown in Fig. 1 as having the band and handle attachment, noted generally by the numeral 17, attached thereto.

The band 18 is constructed of flat stainless steel or other similar material and possesses inherent springy characteristics. This band is substantially circular in shape and is provided with radially outwardly extending free exteriorly screw threaded ends 19 and 20. These ends 19 and 20 are preferably of concavo-convex formation and the extreme ends thereof 21 and 22 are substantially straight and are adapted to abut against oppositely formed shoulders 23 and 24 which are formed in the inner ends of channels 25 and 26 at diametrically opposite points at the end of the handle 27. Exterior screw threads 28 and 29 are formed preferably at diametrically opposite points at the top and bottom of the end of the handle 27. The channels 25 and 26, of course, may be formed in the usual way by machining and the screw threads both on the ends of the band 18 and on the end of the handle are formed in more or less conventional manner. The handle 27 is provided with a grip portion 29 and a substantially horizontally extending portion 30 which is of sufficient length as to permit the interiorly screw-threaded securing nut 31 to rest on that portion for assembly with the aligned screw threads on the ends of the band and the partial screw threads on the end of the handle as will be described hereinafter. The nut 31 is interiorly screw threaded at 32 and which screw threads are complemental with, as regards pitch and shape, the screw threads on the ends of the band and the partial screw threads on the end of the handle.

In assembling the band and handle attachment on the utensil as shown in Figs. 1 through 6, the free exteriorly threaded ends 19 and 20 of the band 18 are inserted respectively into the channels 25 and 26 until the extreme ends 21 and 22 of the band engage the shoulder or stop portion 24 at the inner ends of each of the channels. When the ends of the band are thus positioned in the channels, the screw threads formed on the ends of the band and the partial screw threads formed on the end of the handle will be in perfect alignment. Then the nut 31 which is preferably exteriorly knurled or of polygonal shape is engaged over the threads on the ends of the band which are in alignment with the threads on the end of the handle and thus the band and handle are immovably associated with the utensil and it will be noted that the nut at its portions 33 and 34 engages with the portions of the glass utensil. When this securing nut is in its proper association with the handle, the ends of the band 35 inwardly of the screw threaded ends thereof are pulled slightly away from and out of contact with that portion of the wall of the glass utensil which the band engages whether it be in the circumferential groove 16 or on the outer surface of the utensil. This results in a tightening effect of the band which the inner end of the nut engages and presses firmly on the band to grip firmly the utensil to which it is attached and thus immovably associate the band and handle attachment with the utensil.

In the modification of the invention as shown in Fig. 4, the end of the handle is provided with the partial screw threads 28 and 29 which have certain oppositely disposed projecting portions 43 thereof extending into opposite sides of the channels 25 and 26. The screw-threaded free ends 19 and 20 of the band are likewise modified in shape in that oppositely disposed recesses or cut-outs 44 are provided and in which recesses the projections 43 are positioned. Thus with the projections 43 mating with the recesses 44 the partial screw threads 28 and 29 on the end of the handle and the screw threads on the ends 19 and 20 of the band are aligned and are, of course, adapted to be secured together and to the vessel by either of the nuts 31 or 38.

In the modification of the invention as shown in Figs. 7 and 8 the stop or shoulder 24 may be provided as in Fig. 5 and, of course, the channels 25 and 26 are also provided. In the inner ends of the channels, however, oppositely disposed recesses 36 are formed and which recesses are of the same depth and width as the inwardly directed ends 37 of the band so as to receive the latter therein and thus positively position and secure the exteriorly threaded free ends of the band in proper alignment with the partial exteriorly threaded end of the handle and further provide for a firm securing of the ends of the band with the end of the handle when the nut is engaged over and about the screw threads. In this instance, the securing nut 38 is made of plastic such as Bakelite and is provided with a polygonal exterior surface. The inner end 39 of the plastic nut is beveled or rounded and this beveled inner end of the nut engages the ends of the band such as shown in Fig. 2 and when in full engagement with the partially screw-threaded end of the handle and the exterior screw threads on the ends of the band and contacting that portion of the vessels 33 and 34 as in Fig. 1 will not in any way result in a scratching or marring of the glass surface of the vessel which it contacts. The nut 38 incidentally may be provided with an interior lining 40 and which lining terminates adjacent the beveled end 39 so that no metal will engage the portions of the glass utensil when the nut is in securing position. This plastic nut may be molded or otherwise fabricated about the liner 40 and, of course, fixedly associated therewith.

In the modification of the invention as depicted in Figs. 9 and 10 the partial exterior threads on the ends of the handles 28 and 29 are provided and the channels 25 and 26 are also provided as in the other figures of the drawing. The exteriorly screw-threaded ends 19 and 20 of the band 18 are provided inwardly of their ends with suitable holes or openings 41 which are adapted to receive therein oppositely disposed projections 42 and which projections are mounted in the respective channels 25 and 26. It will thus be seen that when the free ends of the band are placed in the channels the projections 42 will extend into the openings 41 and thus align the exterior screw threads on the ends of the band with the partially formed screw threads on the end of the handle ready for engagement therewith of the plastic nut 38 and for securing the band and handle attachment about the glass or other cooking utensil.

From the foregoing, it is clear that I have provided a novel means of aligning the screw threaded ends of the utensil encircling band with the partial screw threads on the end of the handle which allows the assembly of the band and handle attachment with the utensil quite readily and assures the proper alignment of the screw threads and assembly by inexperienced help. Then too, the use of the plastic nut is efficacious in that it does not in any way scratch, cut or mar the surface of the glass utensil and there is no weakening of the utensil at the point where the band and handle and nut are associated therewith and consequently no breakage of the glass utensil due to cutting or scratching of the surface of the utensil.

It is understood that the use of either the nut 31 or 38 is optional with any one or all of the disclosed forms of the invention. Further the projections 43, Fig. 4, and the recesses 36, Fig. 7, and the projections 42, Fig. 9, act as a stop means for the free ends of the band and serve to align the screw-threads on the end of the handle with the screw-threads on the ends of the band or vice versa. Conceivably, the screw-threads on the ends of the band, all modifications of the invention, may be dispensed with.

I claim:

1. A band and handle attachment for glass cooking utensil, the utensil, being provided with a circumferential groove and the band being positioned therein and having outwardly extended screw-threaded spaced ends, one end of the handle being partially screw threaded and provided with oppositely disposed channels with the screw-threaded ends of the band positioned therein, a stop means in the form of a shoulder in the inner ends of the channels and the ends of the band engaging the said stop means for aligning the threads thereon with the partial screw threads on the end of the handle and a plastic nut in engagement with the partial screw threads on the end of the handle and the screw threads on the ends of the band, and the said nut being in engagement with portions of the utensil above and below the groove and at a point where the handle is associated with the ends of the band.

2. A band and handle attachment for utensils, wherein the band encircles a portion of the outer circumference of the utensil and is provided with outwardly extended spaced ends, the extreme free end of each extension being bent inwardly toward each other, one end of the handle being provided with oppositely disposed channels with recesses in each of the channels, the ends of the band being disposed in the channels with the bent portions thereof disposed in the said recesses, and means for engaging about the said end of the handle and the ends of the band for securing the band and handle to the utensil.

3. A band and handle attachment for glass cooking utensils wherein the band encircles a portion of the outer circumference of the utensil and is provided with outwardly extending screw-threaded spaced ends having portions thereof bent inwardly toward each other, one end of the handle being partially screw threaded and provided with oppositely disposed channels and a recess in each of the channels with the bent ends of the band inserted in the recesses thereby aligning the threads on the end of the band with the threads on the end of the handle, and a plastic nut in engagement with the threads on the end of the handle and the threads on the ends of the band and which nut is in engagement with portions of the vessel of the utensil and possesses such characteristics as to not scratch or cut into the wall of the utensil which it engages.

4. A band and handle attachment for utensils, wherein the band encircles a portion of the outer circumference of the utensil and is provided with outwardly extending spaced screw threaded ends, one end of the handle being partially screw threaded and being provided with oppositely disposed channels with the said ends of the band disposed therein, a projection disposed in each of the channels, and each of the ends of the band having an opening therein so that when the bands are disposed in the channels the projections extend into the openings in the ends of the band, and a nut in engagement with the threads on the end of the handle and the threads on the end of the band for securing the ends of the band and the end of the handle together and to the utensil.

5. A band and handle attachment for glass cooking utensils, wherein the band encircles a portion of the outer circumference of the utensil and is provided with outwardly extended screw-threaded ends, one end of the handle being partially screw threaded and being provided with oppositely disposed channels, a projection in each of the channels, the screw-threaded ends of the band each being provided with an opening and positioned in the channels so that the opening engages the projections whereby the threads on the ends of the band are aligned with the threads on the end of the handle, and a plastic securing nut in engagement with the threads on the end of the handle and the threads on the ends of the band and which nut is in engagement with opposite portions of the utensil and secures the band and handle to the utensil.

6. A band and handle attachment for glass utensils, wherein the band encircles a portion of the outer circumference of the utensil and is provided with outwardly extended spaced end portions, one end portion of the handle being provided with oppositely disposed channels for receiving the spaced end portions of the band therein, and a plastic securing means positioned over and about the said end portion of the handle and the ends of the band for securing the band and handle to the utensil, said plastic securing means fitting against the glass utensil.

7. A band and handle attachment for glass cooking utensils wherein the band encircles a portion of the outer circumference of the utensil which band has connected therewith a suitable handle, and a securing means including a plastic nut fitting over one end of the handle and in contact with the band for securing the same about the utensil and the nut contacting opposite portions of the utensil and the said nut possessing such characteristics as to not scratch or cut into the surface of the glass utensil when in securing position with respect to the utensil and handle associated therewith.

8. A band and handle attachment for utensils, wherein the band comprises a main part of substantially circular outline encircling a portion of the outer circumference of the utensil, and the band having outwardly extending spaced end portions, the main part of the band being substantially flat in cross section, the said outwardly extending portions being of substantial width and of concavo-convex formation in cross section, and said end portions being screw threaded, one end portion of the handle being partially screw threaded and provided with oppositely disposed channels to receive said end portions of the band, said channels each having an outwardly curved bottom wall conforming to the concave formation of the inner side of said end portions of the band, and said channels each having side walls forming abrupt shoulders bordering the side edges of the outwardly curved bottom wall, means on said end portion of the handle engageable by parts of said end portions of the band when the end portions of the band are placed in said channels and acting to position the end portions of the bands to align the threads thereon with the threads on the end portion of the handle, and a nut engageable over the aligned threads on the end portions of the band and the threads on the end portion of the handle for securing the band and handle to the utensil.

9. A band and handle attachment for utensils, wherein the band comprises a main part of substantially circular outline encircling a portion of the outer circumference of the utensil, and the band having outwardly extending spaced end portions, the main part of the band being substantially flat in cross section, the said outwardly extending end portions being of substantial width and of concavo-convex formation in cross section, and said end portions being screw threaded, one end portion of the handle being partially screw threaded and provided with oppositely disposed channels to receive said end portions of the band, each of said channels having an outwardly curved bottom wall conforming to the concave formation of the inner side of said end portions of the band, and each of said recesses having side walls forming abrupt shoulders bordering the side edges of the outwardly curved bottom wall, a stop means on said end portion of the handle at the inner end of each of said recesses, the end portions of the band being positioned in said channels in engagement with the stop means and thereby aligning the threads of said end portions of the band with the threads on said end portion of the handle, and a nut engageable over the aligned threads on the end portions of the band and the threads on the end portion of the handle for securing the band and handle to the utensil.

HARRY P. SERIO.

REFERENCES CITED

The following references are of record in the file of this patent:

UNITED STATES PATENTS

| Number | Name | Date |
| --- | --- | --- |
| 452,381 | Meisselbach | May 19, 1891 |
| 2,305,492 | Poglein | Dec. 15, 1942 |